Patented June 13, 1950

2,511,825

UNITED STATES PATENT OFFICE 2,511,825

METHOD OF REPLACING CATIONS IN MILK

Robert J. Myers, Rydal, Pa., assignor to Rohm & Haas Company, Philadelphia, Pa., a corporation of Delaware No Drawing. Application November 8, 1946, Serial No. 708,799

3 Claims. (Cl. 99—54)

This invention relates to a process for removing a metal cation from a liquid medium which cannot be subjected to wide changes in pH on the acid side and replacing this cation with a second metal cation. With greater particularity, this invention concerns a method for replacing a first metal cation in a liquid medium with the ammonium ion and displacing this latter ion with a selected second metal ion. Specifically, the invention deals with a novel method of replacing the sodium in milk with such elements as potassium and/or calcium or magnesium.

Recent investigations have indicated that there may be an advantage under certain conditions in removing sodium from milk. Milk free from sodium or low in sodium appears to be advantageous in cases of hypertension. The practical accomplishment of this change requires that the milk remain potable. This precludes replacing of sodium with hydrogen ions, as from cation exchange resins in their hydrogen form with subsequent neutralization, as has been possible under other conditions. The direct interchange of sodium by another metal cation has not proved feasible here nor efficient, and milk so treated has a bitter taste.

A method has now been found for the removal of sodium from milk with replacement thereof by other suitable metal ion such as potassium, magnesium, calcium, or mixtures of such metal ions. It has been found that milk containing sodium may be contacted with a cation exchange material in the form of its ammonium salt or complex, thus replacing sodium with ammonium ions. These may then be displaced by treatment with approximately equivalent proportion of a base of an acceptable metal, such as potassium hydroxide or calcium hydroxide. These hydroxides are preferably used as a mixture in a ratio about that naturally occurring in milk. Ammonium may be taken off as by warming under reduced pressure or by drying under reduced pressure, as in spray drying.

As cation exchange materials, there may be used any of the resinous exchangers which are capable of existing in the form of metal salts or ammonium salts and in the acid form. There may also be used the so-called carbonaceous zeolites which are likewise capable of existing in these different forms. Typical of the cation exchange resins are those prepared by sulfonation of phenol-formaldehyde resins. These may be sulfonated in the aromatic nuclei or in the side chains or in both positions. A typical high capacity resin may be prepared by condensation of mono- or polyhydric phenols, formaldehyde, and a metal sulfite. The ammonium form is prepared from the hydrogen form by treatment of the latter with dilute ammonium hydroxide. While the ammonium form exchanges its ammonium content for sodium, the reverse exchange does not generally take place satisfactorily. It is necessary, therefore, for regeneration of the sodium form to the ammonium form to convert first to the hydrogen form and then to the ammonium form. This, of course, also applies to resin made in its sodium form; it, too, should be first converted to the hydrogen form before conversion to the ammonium form. It may then be efficiently used for exchange of metal ions for ammonium.

While sodium ions are those which it is primarily desired to replace, other ions are also usually exchanged. Thus, potassium, calcium, and magnesium are taken up, but may readily be restored when the milk is reconstituted as to its mineral content. This permits changes in proportions of metal ions and introduction of metal ions not usually found in milk, if such should be desired, such as lithium.

As examples of the treatment of milk for the replacement of sodium, the following typical procedures are presented.

A glass column was packed with 218 milliliters of a resin formed by condensing together phenol, formaldehyde, and sodium bisulfite, converting the condensate to the infusible, insoluble form, and crushing to a twelve to fifty mesh size of particles. The resin was treated with an excess of a 4% hydrochloric acid solution, rinsed with water, then treated with 600 milliliters of a 14% ammonium hydroxide solution, and rinsed with water until the effluent gave no indication of alkalinity with phenolphthalein. Treating was performed at a flow rate of one gallon per square foot per minute. Rinsing was carried on at two gallons per square foot per minute.

Skim milk was then passed downflow through the column at the rate of one gallon per square foot per minute. The first two hundred milliliters of effluent were sodium-free. Thereafter, the milk contained some small amount of sodium. Yet it was found that under the conditions of this test twenty-five gallons of milk could be treated per cubic foot of resin with less than 140 parts per million of sodium remaining in the effluent. Thus, at least 75% of the sodium could be removed from this volume of milk with one cubic foot of resin. Most of the potassium was simultaneously removed and, along with this, a considerable fraction of the magnesium and calcium. During the early stages of treatment, the resin absorbed some of the white pigment components.

The resin was rinsed and then regenerated by conversion to the acid form followed by conversion to the ammonium form. The regenerated resin was used with upflow of milk. The removal of sodium was increased and the absorption of white pigmenting materials greatly lessened.

A dilute solution of potassium hydroxide was added to portions of the effluents from the above procedures to bring the milk to an approximately normal mineral content, 9.7 grams of potassium hydroxide being dissolved in water and added to a liter of the milk containing ammonium ions.

In another example, one liter of milk was passed upflow through a bed of cation exchange resin from phenol-formaldehyde-sulfite in its ammonium form. The resin removed the sodium, magnesium, calcium, and potassium and replaced these elements with ammonium ions. The total amount of metal ions removed was equal to 0.173 gram equivalent per liter. To reconstitute the milk to obtain a K/Ca ratio similar to that of the original milk at the same mineral content, there were added 5.6 grams of potassium hydroxide and 2.7 grams of calcium hydroxide, both being dissolved in water. The resulting solution was warmed under reduced pressure to cause displacement of ammonia.

The displacement of one or more metal cations with the ammonium ion and the substitution therefor of one or more selected cations may be applied to the preparation of proteinaceous materials and other products of biological origin. For example, calcium or barium salts of amino acids may be isolated and converted to sodium salts without passing through an acid state by the use of a cation exchanger in its ammonium form. Again, in the preparation of hexose phosphates, it is usual to concentrate the desired phosphates in the form of calcium salts which are more soluble cold that hot. The calcium salts may be converted to ammonium salts and the ammonium ions displaced with sodium or potassium.

I claim:

1. A process for replacing sodium in milk with other metal cations which comprises contacting milk containing sodium with a sulfonated phenol-formaldehyde cation-exchange resin in its ammonium salt form, thereby replacing sodium with ammonium ions, reconstituting the metal content of the treated milk by adding thereto calcium and potassium hydroxides, and displacing the ammonium ions therewith.

2. A process for replacing sodium in milk with other metal cations which comprises bringing together milk containing sodium and a resinous cation-exchanger in its ammonium form, thereby replacing the sodium with ammonium ions, reconstituting the treated milk by adding thereto a soluble strong base of a metal other than sodium, and displacing ammonium ions therewith.

3. A process for changing the metal ion content of milk which comprises passing milk upflow through a bed of a cation-exchanger in its ammonium form, thereby replacing metal cations of the milk with ammonium ions, reconstituting the treated milk by adding thereto in water solution soluble strong metal hydroxides, and displacing the ammonium ions therewith.

ROBERT J. MYERS.

REFERENCES CITED

The following references are of record in the file of this patent:

UNITED STATES PATENTS

| Number | Name | Date |
| --- | --- | --- |
| 1,937,527 | Otting | Dec. 5, 1933 |
| 2,102,642 | Otting | Dec. 21, 1937 |

OTHER REFERENCES

"Readjustment of Salts in Milk by Base Exchange Treatment," by J. F. Lyman et al. Reprinted from Industrial and Engineering Chemistry, vol. 25, page 1297, Nov. 1933. Reprint comprises pages 1 to 5.